(12) United States Patent
Ruden et al.

(10) Patent No.: US 9,095,915 B2
(45) Date of Patent: Aug. 4, 2015

(54) AXIALLY POSITIONING A ROTATING ARTICLE

(71) Applicants: Shawn Allen Ruden, Shakopee, MN (US); Bryan Charles Roberts, Prior Lake, MN (US); Michael William Pfeiffer, Savage, MN (US); Kevin James Spiczka, Prior Lake, MN (US)

(72) Inventors: Shawn Allen Ruden, Shakopee, MN (US); Bryan Charles Roberts, Prior Lake, MN (US); Michael William Pfeiffer, Savage, MN (US); Kevin James Spiczka, Prior Lake, MN (US)

(73) Assignee: Seagate Technology LLC, Cupertino, CA (US)

( * ) Notice: Subject to any disclaimer, the term of this patent is extended or adjusted under 35 U.S.C. 154(b) by 174 days.

(21) Appl. No.: 13/678,319

(22) Filed: Nov. 15, 2012

(65) Prior Publication Data
US 2014/0130360 A1 May 15, 2014

(51) Int. Cl.
| | |
|---|---|
| *G01B 5/24* | (2006.01) |
| *G01B 7/30* | (2006.01) |
| *B23F 23/00* | (2006.01) |
| *G01D 5/14* | (2006.01) |
| *B62D 15/02* | (2006.01) |
| *G05B 6/00* | (2006.01) |
| *G01B 1/00* | (2006.01) |
| *G01D 5/347* | (2006.01) |
| *G01B 7/00* | (2006.01) |

(52) U.S. Cl.
CPC ............... *B23F 23/00* (2013.01); *B62D 15/02* (2013.01); *G01D 5/145* (2013.01); *G01D 5/3473* (2013.01); *G01D 5/34707* (2013.01); *G01D 5/34738* (2013.01); *G05B 6/00* (2013.01)

(58) Field of Classification Search
CPC . G01D 5/34738; G01D 5/145; G01D 5/3473; G01D 5/34707; G05B 6/00; B62D 15/02
USPC ............................ 33/1 PT, 517, 708, 706, 707
See application file for complete search history.

(56) References Cited

U.S. PATENT DOCUMENTS

| | | | |
|---|---|---|---|
| 6,566,865 B2 | 5/2003 | Yasuda | |
| 6,637,118 B2 * | 10/2003 | Feichtinger | ................... 33/1 PT |
| 7,633,289 B2 | 12/2009 | Fayaud | |
| 7,646,314 B2 | 1/2010 | Branchereau | |
| 8,739,425 B2 * | 6/2014 | Henshaw | ........................ 33/708 |
| 2010/0074567 A1 * | 3/2010 | Giordana | ...................... 384/448 |

* cited by examiner

*Primary Examiner* — Laura Martin
*Assistant Examiner* — Rhyan C Lange
(74) *Attorney, Agent, or Firm* — Hall Estill Attorneys at Law

(57) ABSTRACT

An apparatus and associated methodology providing an axial positioner for a rotatable shaft that is selectively extensible along an axis of rotation. The apparatus includes a sleeve having a first race operably fixed in rotation with the shaft, and a second race operably fixed at a predetermined rotational position. The races define opposing bearing surfaces operably supporting the first race in rotation with respect to the second race. The apparatus also includes an indicia device attached to the second race.

21 Claims, 8 Drawing Sheets

AXIALLY POSITIONING A ROTATING ARTICLE

BACKGROUND

Manufacturing lines have generally evolved in complexity by the integration of highly sophisticated automation devices and methods. Gains in productivity continue to be realized as past reliance on human judgment and manipulation is replaced by processor-driven systems. The repeatability of such intelligent systems enables maximizing both quality and production speed. There has also been a general trend toward integrating fabrication and testing operations into the final assembly processes, replacing after-the-fact inspection with in-process quality control and record archiving as much as possible. Complex factory information systems are used to gather real time information about the products in their various stages of manufacture, all aimed at predictively preventing any occurrence of nonconforming product.

For automation lines that include rotating articles that extend or move in a linear direction along an axis of rotation ("axial direction"), such as a drive bit for fasteners (e.g. screws) or a bit for drilling, it is desirable to provide in-process quality control by way of detecting the axial position of the rotating article. For example, when the manufacturing process includes a step of driving screws into a product being manufactured, detection of the axial position of the drive bit can be used to determine and control various stages of the screw driving process, including when the drive bit makes contact with a screw head, when the screw makes contact with the target object, and the final relative position of the screw head after having been driven and secured at a predetermined torque.

SUMMARY

Some embodiments of the present invention contemplate an axial positioner apparatus for a rotatable shaft. The apparatus includes a sleeve having a first race operably fixed in rotation with the shaft, and a second race operably fixed at a predetermined rotational position. The races define opposing bearing surfaces operably supporting the first race in rotation with respect to the second race. The apparatus also includes an indicia device attached to the second race.

Some other embodiments of the present invention contemplate an axial positioner apparatus for a rotatable shaft. The apparatus includes a sleeve having an inner race fixed in rotation with the shaft, and an outer race that is rotationally keyed to a stationary member while permitting the outer race to have axial freedom of movement to maintain the outer race fixed at a predetermined rotational position during axial displacement. The races define opposing bearing surfaces operably supporting the inner race in rotation with respect to the outer race. The apparatus also includes an indicia device attached to the outer race. The apparatus also includes a read device noncontactingly reading the encoded device to detect the axial position of the shaft. The apparatus also includes a controller responsive to the read device in selectively extending the shaft axially.

Some embodiments of the present invention contemplate a method for controlling the axial position of a rotating shaft that is selectively extensible along an axis of rotation. The method includes steps of: attaching a sleeve to the shaft, the sleeve having an inner race fixed in rotation with the shaft, an outer race that is rotationally keyed to a stationary member while permitting the outer race to have axial freedom of movement to maintain the outer race fixed at a predetermined rotational position during axial displacement, the races defining opposing bearing surfaces operably supporting the inner race in rotation with respect to the outer race, and an indicia device attached to the outer race; selectively displacing the shaft axially; reading the indicia device with a noncontacting read device to detect the axial position of the shaft; and controlling the displacing step in response to the reading step.

These and various other features and advantages will be apparent from a reading of the following detailed description and accompanying drawings.

DETAILED DESCRIPTION

Figure 1:
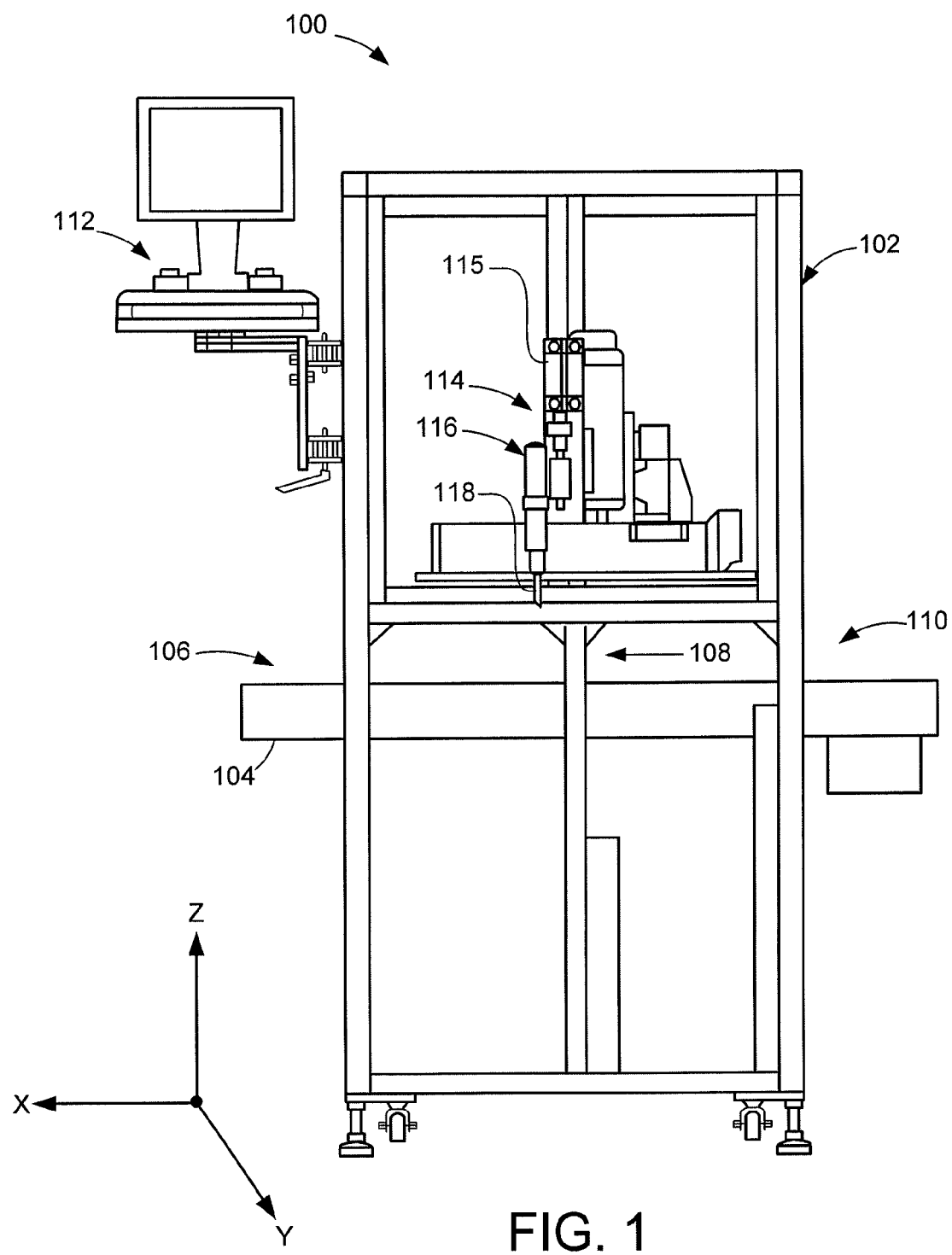
FIG. 1 is an elevational view of an automated manufacturing assembly that is constructed in accordance with embodiments of the present invention.

Referring to the drawings collectively, and now more particularly to FIG. 1 which is an elevational depiction of an automated manufacturing assembly 100 that is constructed in accordance with embodiments of the present invention. In these illustrative embodiments, and not by limitation, the automated manufacturing assembly 100 is constructed as a modular unit that is readily joinable with other similar modular units to form a continuous in-line manufacturing operation. That is, the modular units can be swapped in and out and rearranged for manufacturing various different products.

Generally, the automated manufacturing assembly 100 comprises a structural framework 102 affording skeletal support of various components described hereinbelow. A section of conveyor 104 can connect to conveyor sections in adjacent modular units (not depicted). The conveyor 104 transports a work piece (not depicted) from an upstream side 106 of the framework 102 into a work zone 108. When work on the workpiece is completed, the conveyor 104 can transport the workpiece from the work zone 108 to a downstream side 110 of the framework 102. A processor 112 executes computer instructions stored in memory that control the automated manufacturing assembly 100 in predetermined sequences that move and do work on the workpiece.

In the work zone 108 the automated manufacturing assembly 100 has a three-axis positioning assembly 114 designed to perform a particular manufacturing operation on the workpiece. In these illustrative embodiments the three-axis positioning assembly 114 includes a z-axis actuator 115. The three-axis positioning assembly 114 ultimately provides all the supports and controls to enable an end effector 116 to work on the workpiece. The end effector 116 has a selectively movable shaft 118 that performs the operation. For purposes of these illustrative embodiments the movable shaft 118 is selectively rotated and selectively extended along the axis of rotation (along the z-axis as depicted). This type of end effector 116 is categorically referred to as an axial compliant rotatable shaft. For purposes of this description, "axial position" and "axially" means the position and direction, respectively, along the axis of shaft 118 rotation, or in other words the position and direction, respectively, along the z-axis as depicted in FIG. 1.

Figure 2:
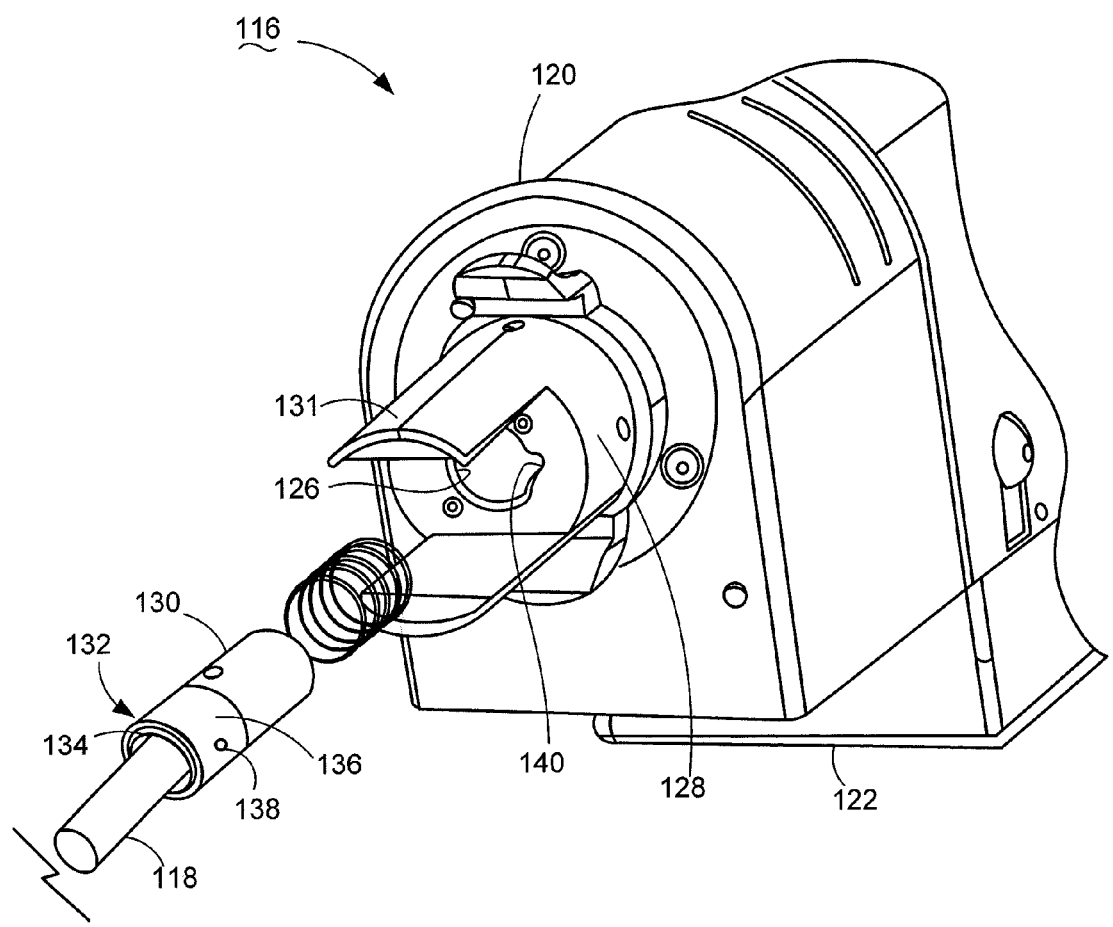
FIG. 2 is an enlarged and partially exploded isometric depiction of a portion of the end effector of FIG. 1.

FIG. 2 is an enlarged and partially exploded isometric depiction of a portion of the end effector 116. An enclosure 120 encloses a motor (not depicted) for rotating the shaft 118, and also encloses a mechanism for extending the shaft 118 axially such as a spline drive or fluid piston and the like. The enclosure 120 includes a planar face 122 for mounting the end effector 116 to the z-axis actuator 115 or other supporting structure. The shaft 118 rotates and extends axially through a bore 126 defined in a stationary bulkhead 128 attached to the enclosure 120. A proximal end 130 of the shaft 118 has a linkage that is attached to output linkages of the rotation and extension mechanisms inside the enclosure 120. The bulkhead 128 defines an annular collar 131 that can provide a positive stop against which an outboard shaft bearing 142 (FIG. 3) abuttingly engages when the shaft 118 is fully retracted. A guided sleeve 132 is attached near the proximal end of the shaft 118 and provides for axially positioning the shaft 118 in accordance with the embodiments of this invention.

Figure 3:
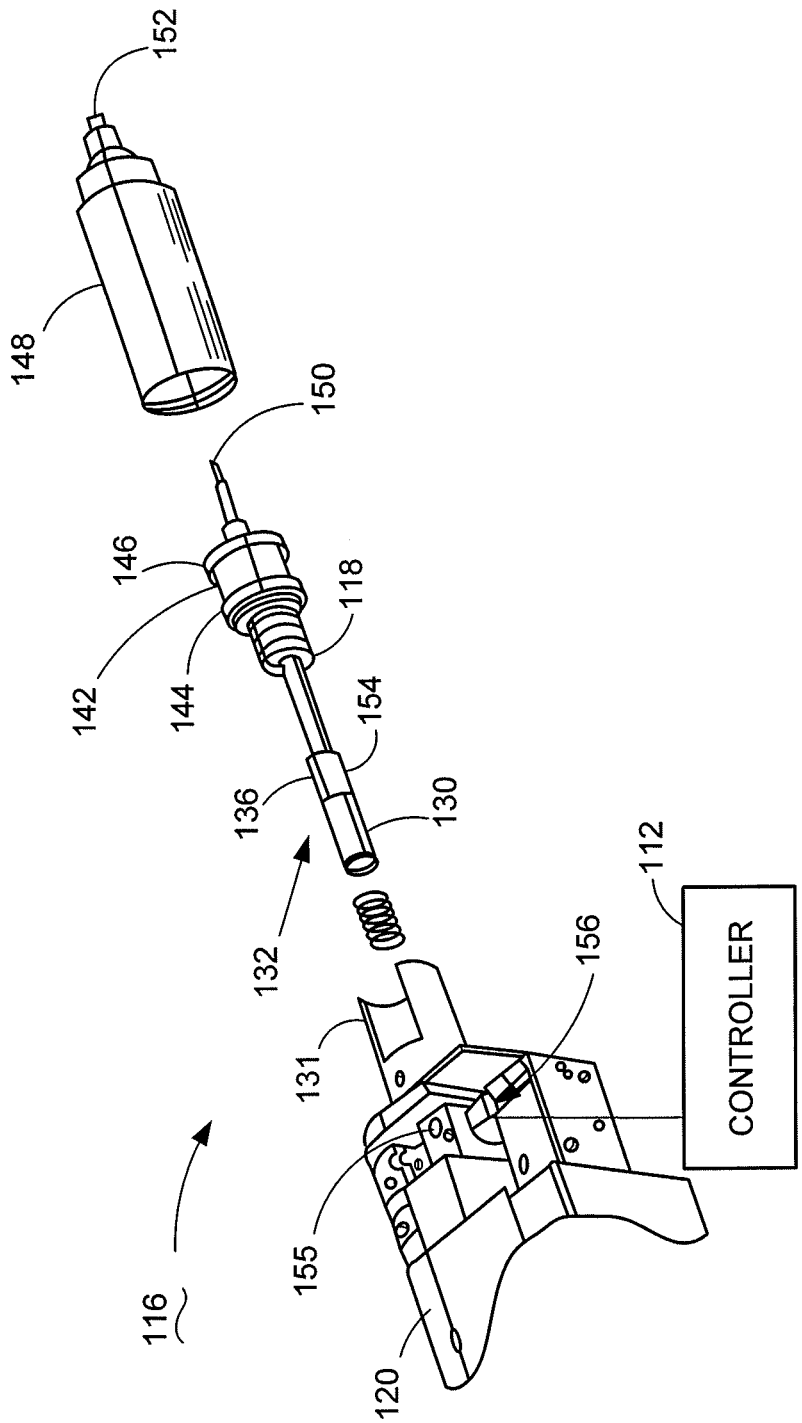
FIG. 3 is another partially exploded isometric depiction of the end effector of FIG. 1.
Figure 4:
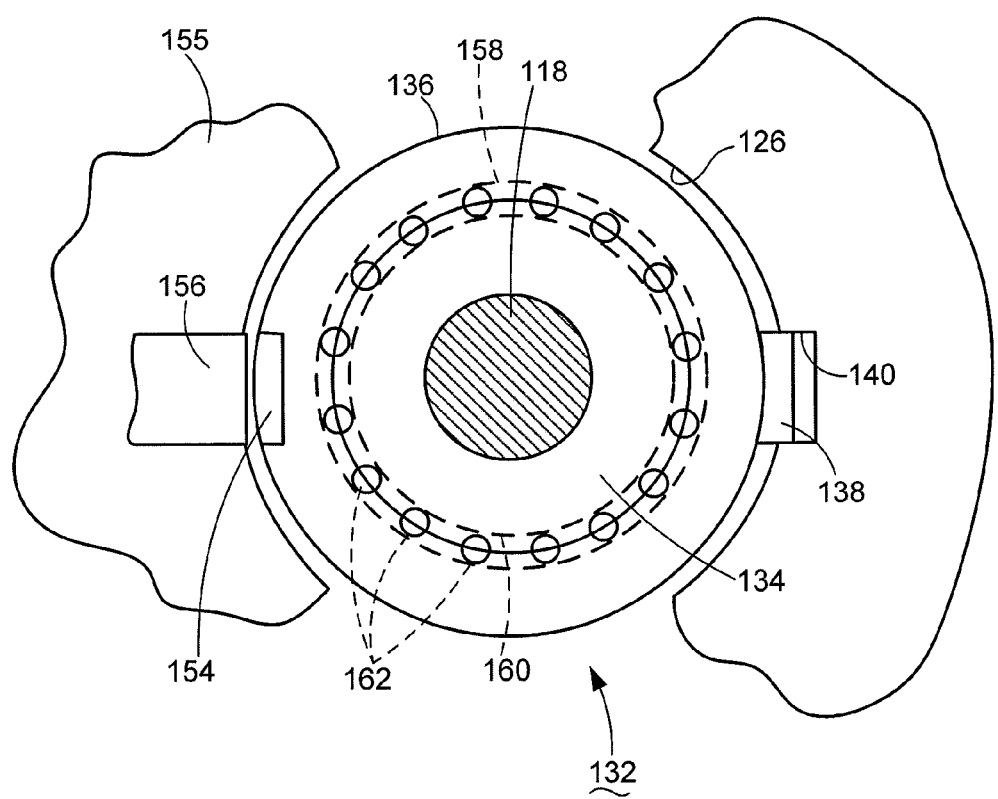
FIG. 4 is an enlarged cross-sectional depiction of a portion of the end effector of FIG. 1.

Staying with FIGS. 2 and 3 while further considering FIG. 4, the guided sleeve 132 is constructed of a high speed bearing such as a roller bearing or a fluid dynamic bearing and the like, having an inner race 134 fixed in rotation with the shaft 118. The guided sleeve 132 also has an outer race 136 that is "guided" by being keyed to the bulkhead 128 so that, unlike the inner race 134, the outer race 136 remains fixed at a predetermined rotational position. In these illustrative embodiments the outer race 136 supports a protuberant member 138, such as the dowel pin depicted, that is sized to slidingly engage a slot 140 defined in the bore 126. The outer race 136 thus remains rotationally fixed during shaft 118 rotation by the protuberant member 138 being rotationally constrained to the slot 140. However, the outer race 136 enjoys freedom of axial movement during shaft 118 extension by the protuberant member 138 being slidingly engageable in the slot 140. To facilitate that sliding engagement one or both of the protuberant member 138 and slot 140 can be advantageously constructed of a relatively hard and lubricious material, such as a lubricant-impregnated composite material or more particularly an ultra-high molecular weight polyethylene material and the like.

Although here the protuberant member 138 is supported by the outer race 136 and the slot 140 is defined in the bore 126, the contemplated embodiments are not so limited in that in alternative equivalent embodiments the protuberant member can be defined by the bulkhead bore and the slot can be defined in the outer race.

FIG. 3 depicts the end effector 116 having the outboard shaft bearing 142 supporting the distal end of the shaft 118 in rotation and extension. The bearing 142 has a first bearing surface 144 and a second bearing surface 146 that slidingly engage the bore of a collar 148 during extension and retraction of the shaft 118. A drive bit 150, such as a Torx® bit, is ultimately rotatably supported at a distal end of the shaft 118 extending through an aperture 152 formed in the collar 148.

A signaling indicia 154 is shown attached to the outer race 136 of the guided sleeve 132. The signaling indicia 154 can be any suitable target for reading the axial position of the outer race 136. Preferably, the signaling indicia is an encoded strip of magnetic recording media in accordance with the description herein. However, the present embodiments are not so limited in that equivalent alternative embodiments contemplate the signaling indicia can be any digital storage device such as optical storage media or a radio frequency transmission storage device, and the like.

Part of the enclosure 120 is removed in FIG. 3 to reveal substructure 155 supporting a sensor 156 that reads the signaling indicia 154 to detect an instantaneous axial position of the guided sleeve 132 as the signaling indicia 154 moves axially in relation to the sensor 156. For example, again without limitation, where the signaling indicia 154 is an encoded magnetic strip the sensor can be a suitable read device such as a physically noncontacting magnetic transducer. The noncontacting reading capability of the transducer simplifies and thereby reduces the expense of construction, and advantageously does not physically impede the guided sleeve 132 axial movement.

FIG. 4 depicts a cross-sectional view of the shaft 118 and guided sleeve 132 as described. In these illustrative embodiments the outer race 136 of the guided sleeve 132 has an outer bearing surface 158 and the inner race 134 has an opposing inner bearing surface 160, with a plurality of rolling bearing members 162, such as ball bearings or spindle bearings, contactingly engaging both of the bearing surfaces 158, 160 simultaneously to support the inner race 134 in smooth rotation with respect to the rotationally stationary outer race 136. However, these depicted embodiments are illustrative and not limiting in that alternative equivalent embodiments contemplate the opposing bearing surfaces 158, 160 remaining in noncontacting engagement but rather operably supported by a pressurized fluid such as in a fluid dynamic bearing and the like.

Figure 5:
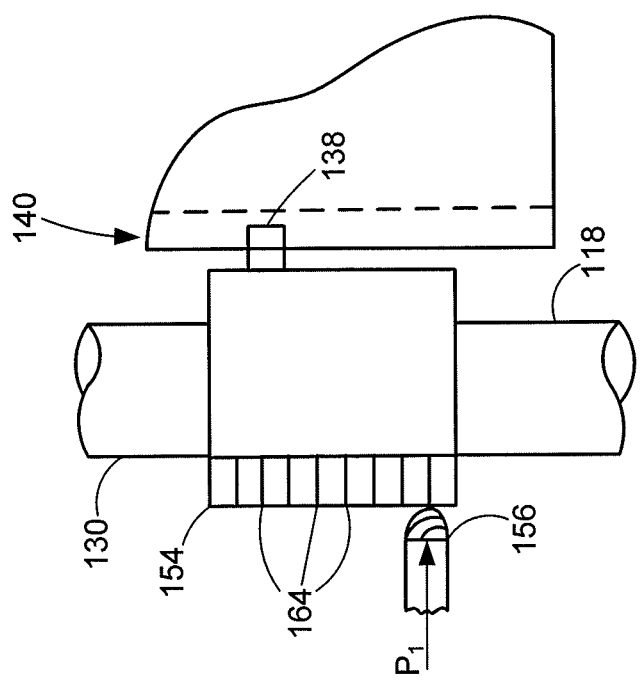
FIG. 5 is a top diagrammatical depiction of a portion of the end effector of FIG. 1.

FIG. 5 is a top view that diagrammatically depicts the signaling indicia 154 as having a pattern of indicia 164 stored to it. The skilled artisan understands that the stored indicia 164 can form two offset square waveforms which the sensor 156 reads within different communication channels, such as channel A and channel B, in the interface with the controller 112 which, in turn, decodes and combines the square waveform signals into a quadrature pulse waveform. The direction of guided sleeve 132 movement relative to the sensor 156 is ascertainable in terms of which waveform (A or B) is leading the other. Incremental displacement is ascertainable by counting the number of quadrature pulses during the displacement.

Figure 6:
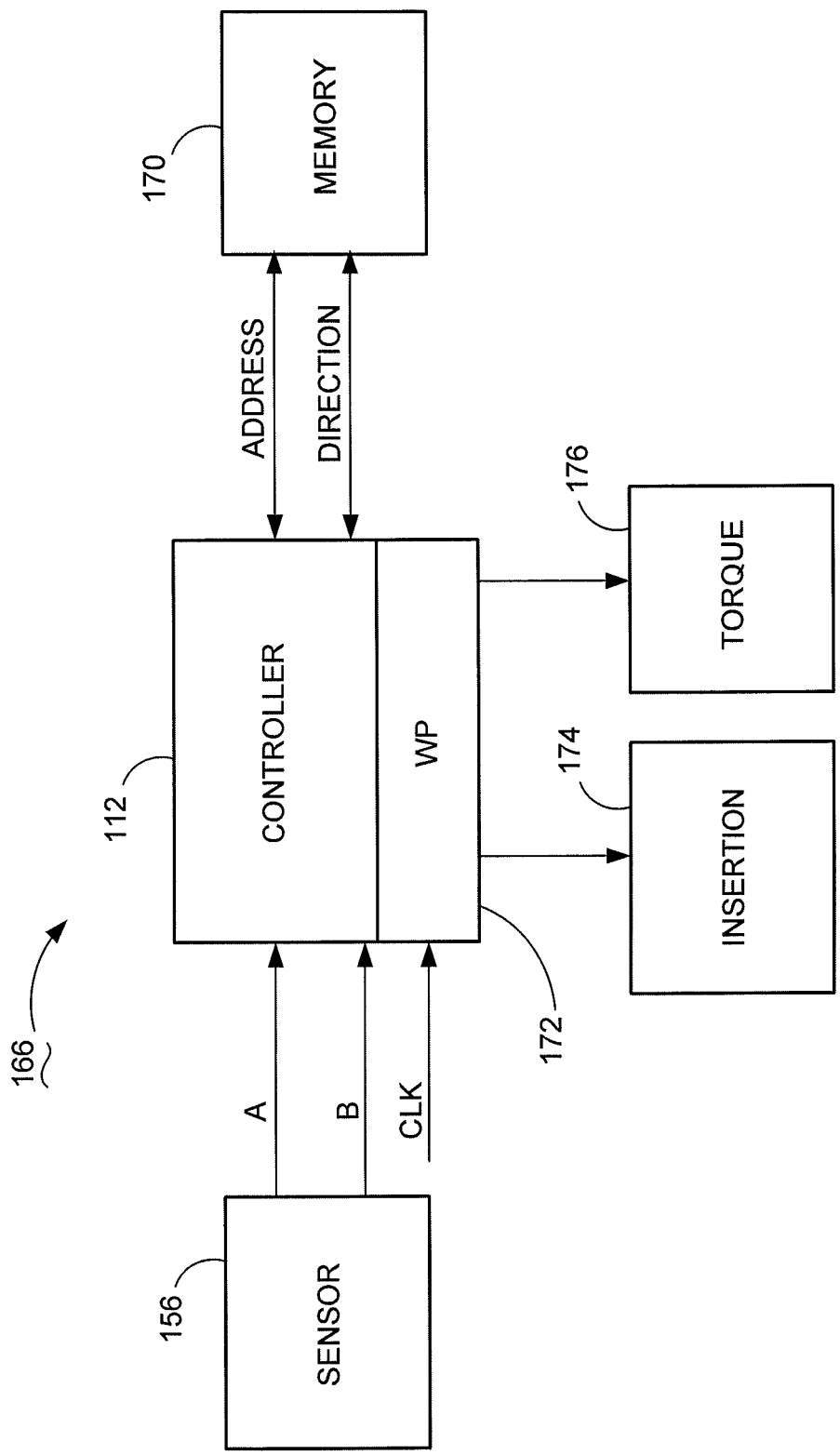
FIG. 6 is a functional block depiction of parts of a control system in the end effector of FIG. 1.

FIG. 6 depicts a functional block diagram of control circuitry 166 which can be embodied entirely in software and/or in hardware such as but not limited to a field programmable gate array or an application specific integrated circuit. The processor-based controller 112 receives inputs from each of the A and B channels as well as a clock signal. The controller 112 continuously samples the waveforms in both channels and calculates address and direction data that is buffered in a memory 170.

The controller 112 performs top-level control of a workpiece processing computer routine ("WP") 172. For purposes of this description the functions of the controller 112 are described with respect to the workpiece being a threaded fastener that is axially advanced as it is installed to reach at least a predetermined insertion depth and at least a predetermined attachment torque. One function of the WP routine 172 depicted in block 174 is to ensure the threaded fastener is installed to at least the predetermined insertion depth by monitoring the axial position of the guided sleeve 132 which, it will be recalled, is fixed in axial movement with the rotating shaft 118. That is, the axial displacement of the guided sleeve 132 is indicative of the axial displacement of the threaded fastener. Another function of the WP routine 172 depicted in block 176 is to ensure the threaded fastener is installed in a secure engagement of at least a predetermined minimum torque.

Figure 7:
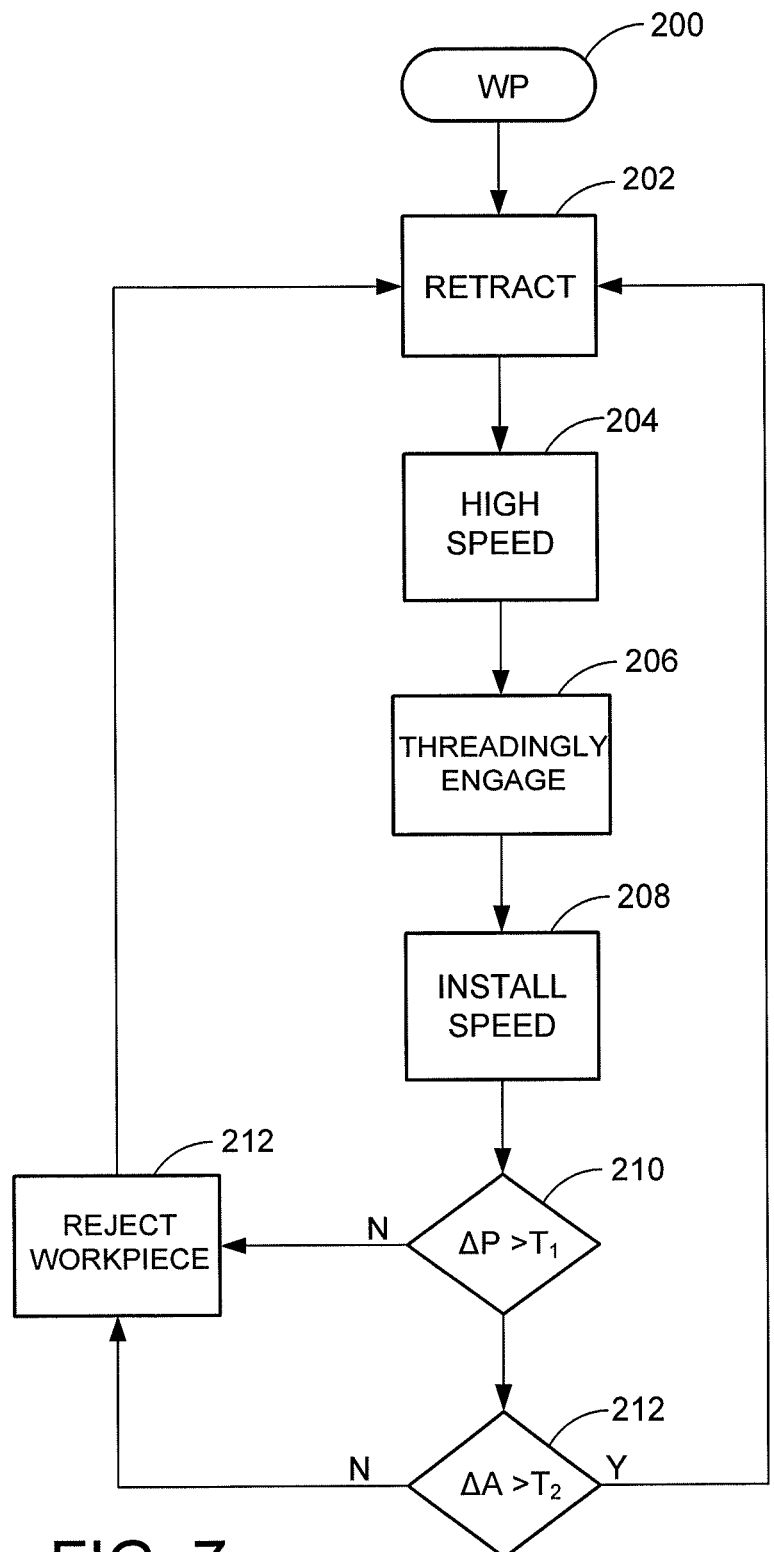
FIG. 7 is a flowchart depicting steps in a method for WORKPIECE PROCESSING in accordance with embodiments of the present invention.

FIG. 7 is a flowchart depicting steps in a method 200 for WORKPIECE PROCESSING in accordance with embodiments of the present invention. The method 200 begins in block 202 with the controller 112 commanding the end effector 116 to retract the shaft 118 to a reference position, such as the sensor position $P_1$ depicted in FIG. 5, to begin the next workpiece processing ("WP") cycle. At this retracted position a fastener can be placed on the driver bit 150. Then in block 204 the controller 112 commands the axial positioner to extend the shaft 118 at a relatively high speed during the part of the WP cycle that the leading tip of the fastener approaches the workpiece. This high-speed approach preferably occurs under the auspices of a closed-loop velocity control and according to a predetermined velocity profile. This permits continuously monitoring and compensating in real time by comparing actual sensed position from the signaling indicia 154 address against expected position according to the velocity profile. The shaft 118 is not necessarily rotating while under the closed-loop velocity control.

Figure 8:
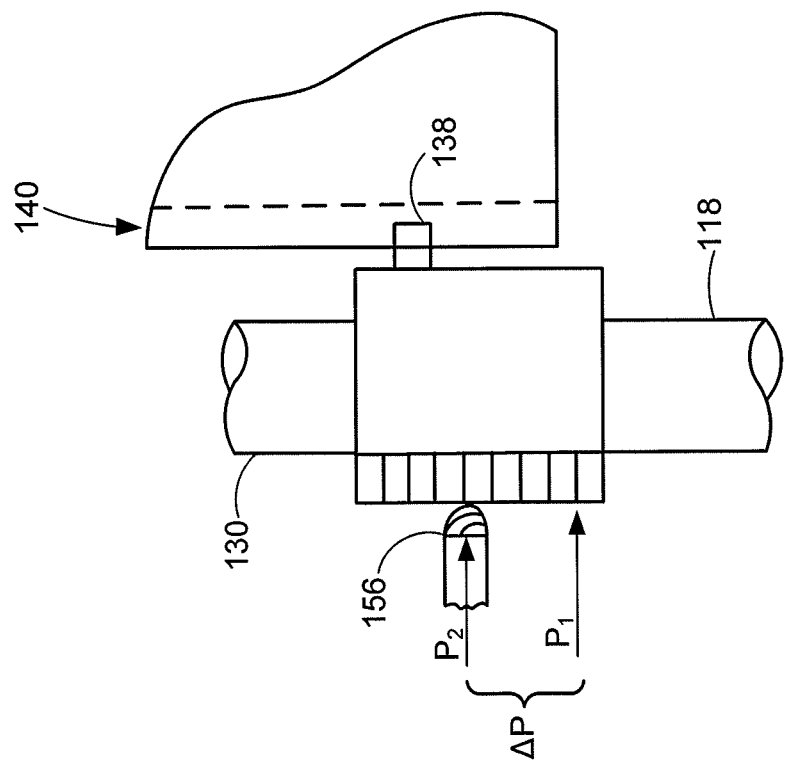
FIG. 8 depicts a view similar to FIG. 5 but after the end effector has been extended.

In block 206 the threading engagement between the leading tip of the fastener and the corresponding fastening feature in the workpiece is initiated. The shaft 118 may or may not be rotating, and may even be dithered or rotated in reverse to facilitate the threading engagement. When proper threading engagement of the fastener is accomplished, then in block 208 the controller 112 commands the end effector 116 to extend the shaft 118 according to an axial velocity matching the threaded axial advancement of the fastener at the particular rotational speed in view of the fastener thread pitch. When the fastener is completely installed, such as might be defined by application of a predetermined torque to the fastener, then the controller 112 calculates from the final address position of the guided sleeve, such as $P_2$ depicted in FIG. 8, the displacement ("$\Delta P$" or "$P_2$-$P_1$") of the guided sleeve 132. In block 210 the controller compares the actual displacement $\Delta P$ to a first predetermined threshold ("$T_1$") corresponding to a key quality characteristic of the workpiece (fastener insertion). For example, without limitation, the threshold displacement can be that which corresponds to the fastener having been successfully installed to at least a minimum insertion depth, so as to provide the fastener head at a flush surface mount. If the determination of block 210 is "yes," then control passes to block 212 where the controller compares the actual rise in motor amperage A during a WP cycle to a second predetermined threshold ("$T_2$") corresponding to another key quality characteristic of the workpiece (fastener torque). If the determination of either block 210, 212 is "no," the workpiece is rejected in block 212, with appropriate system-wide alerts, and then control returns to block 202.

Figure 9:
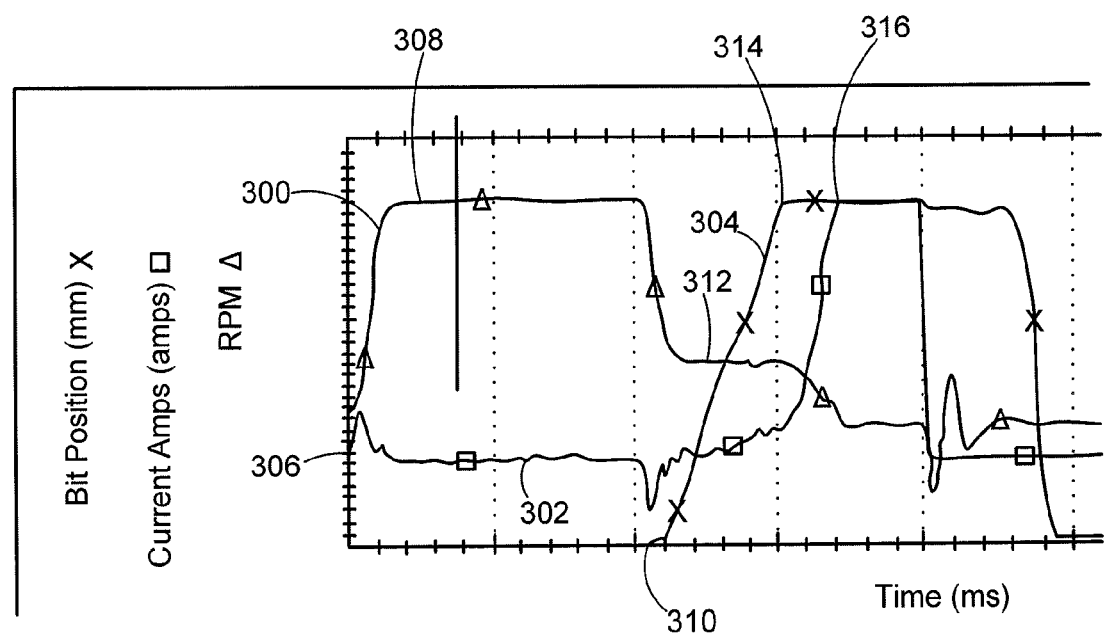
FIG. 9 graphically depicts processing parameters during one cycle of the workpiece processing sequence.

FIG. 9 depicts graphical data obtained by practicing illustrative embodiments to ensure that each workpiece processing cycle results in an adequate insertion of the threaded fastener (block 174 in FIG. 6) to at least a predetermined threshold depth, and to ensure that the fastener is threadingly secured to at least a predetermined threshold torque (block 176 in FIG. 6). Graphed are pertinent process parameters as they varied during one WP cycle of installing a threaded fastener with an end effector constructed in accordance with the illustrative embodiments described above. All of the parameters are plotted against time from the beginning of a WP cycle on the left-hand side of the abscissa. Graph line 300 is the rotational speed (such as revolutions per minute) of the shaft 118 to which the fastener drive bit 150 is affixed in rotation therewith. Graph line 302 is the magnitude of electrical current (amperage) drawn by the motor in the end effector 116 that operably rotates the shaft 118. Graph line 304 is the axial displacement of the drive bit 150, as indicated by the axial-position-readout of the signaling indicia 154 of the guided sleeve 132.

In these illustrative embodiments the shaft 118 is rotationally accelerated from an initial speed 306 (which can be zero) to a predetermined constant speed first achieved at 308 before axial displacement of the shaft 118 begins at 310. The axial displacement of the shaft 118, and hence of the drive bit 150, in these depicted embodiments is substantially a linear function matching the fastener thread pitch to the reduced constant rotational speed 312 of the shaft 118 until a total axial displacement is first achieved at 314. The controller 112 (FIG. 6) can be programmed to compare the observed total displacement at 314 to a predetermined threshold displacement value (not depicted) in order to make the qualitative determination as to whether the fastener was properly inserted, in terms of actual to expected axial displacement. A maximum amperage drawn by the motor rotating the drive bit 150 is first observed at 316 lagging the final displacement of the drive bit 150 as the fastener head is frictionally seated against the insertion feature of the workpiece. An empirical correlation can be derived between the motor amperage and the torque imparted to the fastener. The controller 112 (FIG. 6) can thus likewise be programmed to compare the observed maximum amperage 316 to a predetermined threshold amperage (not depicted) in order to make the qualitative determination as to whether the fastener was properly inserted, in terms of actual to expected torque imparted to the fastener.

It is to be understood that even though numerous characteristics and advantages of various aspects have been set forth in the foregoing description, together with details of the structure and function, this disclosure is illustrative only, and changes may be made in detail, especially in matters of structure and arrangement to the full extent indicated by the broad general meaning of the terms in which the appended claims are expressed. For example, without limitation, the illustrative embodiments of the guided sleeve are constructed to have a rotating inner race and a rotationally stationary outer race. The contemplated embodiments of this invention are not so limited. That is, in equivalent alternative embodiments the guided sleeve can have a rotating outer race and a rotationally stationary inner race. For another example without limitation, the illustrative embodiments of the guided sleeve are constructed to have an axially-directed slot in the bulkhead bore. Accordingly, the rotational position of the outer race is the same for the retracted and extended shaft positions. The contemplated embodiments of this invention are not so limited. That is, in equivalent alternative embodiments the slot can be arcuate in order to rotationally reposition the outer race between the retracted and extended shaft positions.

What is claimed is:

1. An axial positioner apparatus for a rotatable shaft, the apparatus comprising:
   a sleeve having a first race operably fixed in rotation with the shaft, a second race operably fixed at a predetermined rotational position, the races defining opposing bearing surfaces operably supporting the first race in rotation with respect to the second race; and
   an encoded indicia attached to the second race.

2. The apparatus of claim 1 wherein the second race is rotationally keyed to a stationary member to maintain the predetermined sleeve rotational position while permitting the sleeve to have freedom of axial movement.

3. The apparatus of claim 2 wherein one of the second race and the stationary member supports a protuberant member and the other one of the second race and the stationary member defines a cavity sized to permit an operable sliding engagement of the protuberant member in the cavity.

4. The apparatus of claim 3 wherein at least one of the protuberant member and the stationary member comprises an ultra-high molecular weight polyethylene material.

5. The apparatus of claim 1 wherein the sleeve comprises a bearing member that contactingly engages both of the opposing bearing surfaces simultaneously in operably supporting the first race in rotation with respect to the second race.

6. The apparatus of claim 1 comprising a sensor operably detects the axial position of the encoded indicia.

7. The apparatus of claim 6 wherein the encoded indicia moves axially in relation to the sensor.

8. The apparatus of claim 6 wherein the sensor does not physically contact the encoded indicia.

9. The apparatus of claim 6 comprising a controller that is responsive to the sensor in selectively extending the article axially.

10. The apparatus of claim 9 wherein the encoded indicia comprises a digitally encoded storage device.

11. The apparatus of claim 9 wherein the controller executes stored computer instructions that select an axial velocity from a plurality of different axial velocities in response to the sensor.

12. The apparatus of claim 9 wherein the controller executes stored computer instructions that in response to the sensor qualitatively characterize a workpiece that are worked on by the apparatus.

13. The apparatus of claim 12 wherein the qualitative characterization is derived by comparing an observed axial displacement to a predetermined threshold axial displacement.

14. The apparatus of claim 12 wherein the qualitative characterization is derived by comparing an observed amperage to a predetermined threshold amperage.

15. An axial positioner apparatus for a rotatable shaft, the apparatus comprising:
    a sleeve having an inner race fixed in rotation with the shaft, an outer race that is rotationally keyed to a stationary member while permitting the outer race to have axial freedom of movement to maintain the outer race fixed at a predetermined rotational position during axial displacement, the races defining opposing bearing surfaces operably supporting the inner race in rotation with respect to the outer race;
    an encoded indicia attached to the outer race;
    a read device noncontactingly reading the encoded indicia to detect the axial position of the shaft; and
    a controller responsive to the read device in selectively extending the shaft axially.

16. The apparatus of claim 15 that is keyed by one of the outer race and the stationary member supporting a protuberant member and the other one of the outer race and the stationary member defining a cavity sized to permit an operable sliding engagement of the protuberant member in the cavity, wherein at least one of the protuberant member and the stationary member comprises an ultra-high molecular weight polyethylene material.

17. The apparatus of claim 15 wherein the sleeve comprises a bearing member that contactingly engages both of the opposing bearing surfaces simultaneously in operably supporting the inner race in rotation with respect to the outer race.

18. The apparatus of claim 15 wherein the controller executes stored computer instructions that in response to the read device select an axial velocity from a plurality of different axial velocities.

19. The apparatus of claim 15 wherein the controller executes stored computer instructions that in response to the read device qualitatively characterize a workpiece that are worked on by the shaft.

20. A method for controlling the axial position of a rotating shaft that is selectively extensible along an axis of rotation, the method comprising:
    attaching a sleeve to the shaft, the sleeve having an inner race fixed in rotation with the shaft, an outer race that is rotationally keyed to a stationary member while permitting the outer race to have axial freedom of movement to maintain the outer race fixed at a predetermined rotational position during axial displacement, the races defining opposing bearing surfaces operably supporting the inner race in rotation with respect to the outer race, and an encoded indicia attached to the outer race;
    selectively displacing the shaft axially;
    reading the encoded indicia with a noncontacting read device to detect the axial position of the shaft; and
    controlling the displacing step in response to the reading step.

21. An axial positioner apparatus for a rotatable shaft, the apparatus comprising:
    a sleeve having a first race operably fixed in rotation with the shaft, a second race operably fixed at a predetermined rotational position, the races defining opposing bearing surfaces operably supporting the first race in rotation with respect to the second race;
    an encoded indicia attached to the second race; and
    a sensor operably fixed at a predetermined rotational position in alignment with the encoded indicia.

* * * * *